Dec. 25, 1934.　　　A. B. GREEN　　　1,985,321
PULP TESTER
Filed June 2, 1931
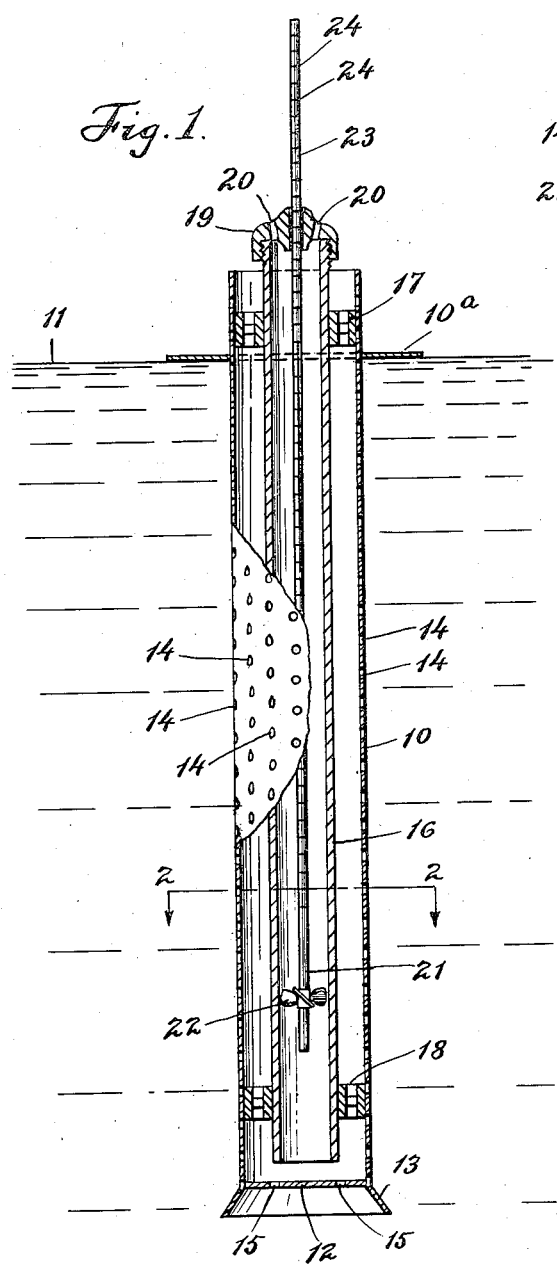
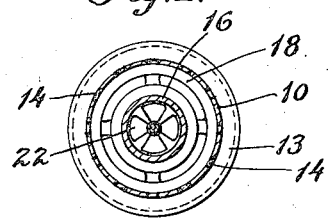
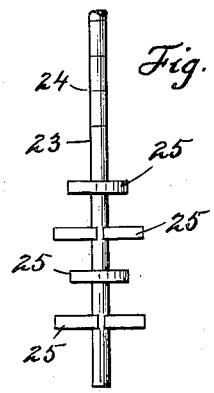
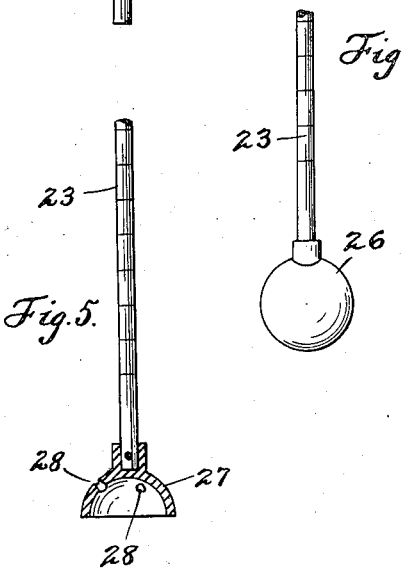
Inventor,
Arthur B. Green,
By Robert M. Pierson,
Attorney Patented Dec. 25, 1934

1,985,321

UNITED STATES PATENT OFFICE 1,985,321

PULP TESTER

Arthur B. Green, Westbrook, Maine

Application June 2, 1931, Serial No. 541,565

10 Claims. (Cl. 73—51)

This invention relates to pulp testers for measuring the rate of release of a liquid from its mixture with solids. Such instruments are used in paper manufacture to determine the condition of the beater pulp and are known as slowness or freeness testers.

In all previous methods of gauging the slowness of paper pulp, so far as I am aware, the area of the screen through which straining takes place has been relatively small and the action occurs by gravity under a low head. Consequently, in order to make the instrument sensitive and enable it to pass a relatively large amount of liquid during a test, it has heretofore been necessary to dilute the pulp to a predetermined thinner density before passing it through the instrument. Pulp testing by these former methods has therefore been a slow operation and has furthermore required considerable calculation due to the fact that no direct reading of the slowness factor has been obtainable on the instrument itself.

Among the objects of my invention are to obtain slowness or freeness tests on paper-making or other pulp in a shorter time than heretofore, to provide a simple and rugged instrument of increased sensitiveness, to provide a pulp tester which will operate by direct immersion in the pulp in the beater vat or tub without the necessity of obtaining diluted samples, and to enable a direct reading of the slowness or freeness factor to be obtained upon the instrument itself.

Of the accompanying drawing, Fig. 1 is a vertical section, partly in elevation, showing a pulp tester embodying my invention in a preferred form.

Fig. 2 is a cross-section on the line 2—2 of Fig. 1.

Fig. 3 is a partial side elevation showing a modification of the sinker element.

Fig. 4 is a partial side elevation showing a second modification of the sinker.

Fig. 5 is a partial side elevation and vertical section showing a third modification of the sinker.

Referring at first to Figs. 1 and 2, 10 is a screening member or straining receptacle or vessel in the form of an elongated cylinder or tube adapted for direct immersion in the body of pulp 11 in a paper beater vat, and provided with a bottom wall 12 and a conical base 13 for supporting the instrument when not in use. Near the upper end of the member 10 is affixed a laterally-projecting annular flange 10$^a$ adapted to be brought down to the surface of the pulp 11 as a marker to determine a fixed depth of immersion of the instrument. The cylindrical body of this straining receptable or screen is formed with a multiplicity of perforations 14 distributed throughout its height and also throughout its circumference. The bottom wall 12 is likewise provided with perforations 15.

Concentrically mounted within the screen 10 is a well tube 16 supported by said screen through a pair of upper and lower spacing spiders 17, 18 which permit the free passage of fluid upwardly therethrough. This tube is open at its lower end to the interior of the screen 10 and is provided with a detachable cap 19 at its upper end formed with perforations 20 for the passage of air.

Mounted to rise and fall in the well tube 16 is a sinker 21 comprising a resistance element or head 22 in the form of a propeller or fan with slanted blades or vanes, and a vertical cylindrical rod or stem 23 affixed to said head so as to rotate therewith as the sinker descends in the rising column of strained pulp water in the tube 16. The stem 23 projects freely through a central guiding aperture in the cap 19 and is provided with a scale constituted by a series of uniformly-spaced circular marks or graduations 24 which register with the upper surface of said cap. In the starting position, the lower end of the sinker stem rests on the bottom wall 12 of the screen, and the resistance head 22 is then just within the lower mouth of the well tube.

In the operation of this form of my invention, the instrument is plunged vertically into the pulp stock 11 contained in the vat or tub of the beater machine down to a level which brings the flange 10$^a$ just to the upper surface of the stock. Thus the height between the surface of the stock and the lower orifice of the well tube 16 is fixed at a point affording a relatively large average hydrostatic head which initially induces flow of water from among the fibers through the perforations in the screen 10. As water enters the interior of said screen, a column thereof rises in the screen and rises to the same height in the well tube 16 but in the latter there is nowhere any downward flow of liquid, all flow being upward. At the start of the straining action the flow of water into the screen 10 and well tube 16 is relatively rapid and the rate thereafter decreases. The sinker descends by gravity in the liquid column at a rate which is substantially uniform. The principal factors affecting the rate, such as varying displacement of liquid by the sinker, which subtracts from the gravitational force a varying amount proportional to the weight of the displaced liquid, and varying frictional resistances upon the sinker caused by differences in the viscosity of the liquid at different depths, are quantitatively so small as to be practically negligible. The spinner form of sinker 21 in practice is calibrated to descend in a column of clear water in a tube at a substantially uniform rate of fifty centimeters in fifteen seconds. At first, during the rapid inflow, the rate of rise of the water column in tube 16 may exceed the rate of fall of the sinker 21. As the flow decreases, a point is reached when the rate of rise of the water column in tube 16 is just equal to the rate of falling of the sinker element, and thereafter the rate of rise of the water becomes less than the rate of falling of said sinker element. Up to the point where the rate of rising just equals the rate of falling, the net effect on the sinker 21 is to rise and at that point the number of graduations on stem 23 appearing above the top surface of the cap 19 is observed and affords a direct reading of the slowness or freeness of the pulp stock. With relatively free stocks, the liquid rises at a faster rate in tube 16 and a greater number of graduations will appear on the stem above the cap 19 than in the case of relatively dense or slow stocks. When the test is completed, the instrument is taken out, washed free of clinging fibers, the water is drained from its interior and it is then ready for a further test.

It will be observed that the sinker constitutes a body or element adapted to move by its relative gravity at a substantially constant rate through a medium such as liquid, and that the graduated stem 23, in connection with the cap 19 against which its divisions are read, constitutes an indicating means for differentially comparing the fixed rate of movement of said body or element with the variable rate of rise of the column of strained liquid to afford a direct reading of the slowness of the pulp at a point when said rates become equal. The form of an instrument embodying this combination and adapted to carry out this series of steps may be widely varied, for it is not broadly essential that the element shall be a sinker or shall move through the column of strained liquid, and there are various possible ways of differentially comparing these rates without departing from my invention.

So far as I am aware, my invention is the first to provide an instrument capable of operating directly in the pulp stock in the beater of a paper factory, thus avoiding the necessity of diluting the stocks and making tests in a laboratory, and is also the first to afford a direct reading of the slowness or freeness of the stock upon the instrument itself. The invention is capable of use in connection with pulps or similar mixtures other than paper pulp.

Any suitable body having a uniform or definite rate of fall in the liquid may be employed as a sinker element. Opposed to the weight of the body causing it to fall, the following forces or resistances are present tending to retard its fall:—(1) buoyancy or displacement of the body, (2) friction of the liquid on the surface of the sinking body and on the walls of the well tube, and (3) friction of the liquid upon itself. By manipulating one or more of these factors it is possible to provide a body which will have a very slow rate of sinking.

While the freely-falling rotary "fan" or "screw-propeller" body 22 shown in Figs. 1 and 2 and having inclined vanes for absorbing the energy of descent is preferred on account of comparative absence of clogging tendency and a minimum of liquid friction between the body and the walls of the tube, other forms of sinkers might be used.

Fig. 3 illustrates a modification consisting of a sinker adapted to descend without rotation in the liquid column in the well tube and having oppositely-projecting staggered horizontal vanes or baffles 25 located at varying heights near the lower end of the graduated stem 23 and adapted to create eddies in the liquid to absorb the energy of descent.

Fig. 4 illustrates another non-rotary modification comprising a sinker having a gravity very slightly greater than the liquid strained from the mixture under test. The gravity of paper pulp is nearly the same as that of water, but the gravity would vary with a different liquid. The sinker stem 23 for a paper pulp tester in this case could be made of a light material such as wood, with a resistance head 26 of heavier material at its lower end, or the whole could be made of hollow metal construction, in a suitable form, weighted to sink slowly in the liquid.

Fig. 5 shows a third non-rotary modification in which the sinker element comprises an inverted cup-shaped resistance head 27 located at the lower end of the indicator stem 23 and provided with perforations 28 permitting the upward passage of the strained liquid through said head.

Still other modifications could be made in the construction of the sinker element as well as in other parts of the instrument without departing from the scope of the invention as defined in the claims.

I claim:

1. A pulp tester comprising means for straining a liquid from its mixture with solid material, means whereby the strained liquid may be directed in a column which rises relative to a fixed point at a rate inversely related to the height of said column, and a sinker adapted to descend in said column at a substantially fixed rate and having an indicator to show its depth relative to said second-mentioned means for measuring the rate of rise of said column relative to the rate of descent of the sinker.

2. A pulp tester adapted for immersion in the pulp to be tested comprising a screen member, a well in said member for creating a rising column of the screened liquid, and a sinker in said well.

3. A pulp tester comprising a well tube, a sinker slidably mounted in said tube and having a depth indicator, and a pulp straining receptacle surrounding said tube and adapted to supply strained pulp liquid to said tube through the lower end of the latter.

4. A pulp tester comprising a well tube, means for measuring the rate of rise of a column of strained pulp liquid in said tube, and a tubular straining receptacle surrounding said tube for supplying the liquid for said column and having a multiplicity of longitudinally and laterally distributed side perforations.

5. A pulp tester comprising a side-perforated tubular straining receptacle adapted for immersion in the pulp and having a fixed immersion marker near its upper end, a well tube located within said receptacle and communicating at its lower end with the latter, and means for measuring the rate of rise of the column of strained liquid within said well tube.

6. A pulp tester comprising a well tube, a sinker therein having a graduated stem projecting through the upper end of said tube, and a straining receptacle surrounding said tube, adapted for immersion in the pulp and having a multiplicity of perforations located at different heights, for supplying strained pulp liquid to the lower end of said tube.

7. A pulp tester comprising a perforated cylinder adapted for immersion in the pulp and having a flange near its upper end for determining the degree of immersion, a well tube in said cylinder open at its lower end to the interior of the latter and having connection with the cylinder so as to permit the passage of fluid between the tube and cylinder, said tube having an air outlet at its upper end and a stem-guiding cap serving as a fixed marker, and a sinker in said well tube having a stem projecting through and guided by said cap and provided with graduations adapted to register therewith.

8. A pulp tester comprising a well tube adapted to receive a liquid, a rotary sinker of screw-propeller form mounted for uniform descent by gravity in the liquid column in the tube and for rotation by reaction against the liquid, said sinker having an indicator stem adapted to register with said tube, and immersible means surrounding the tube for supplying strained pulp liquid to said tube through its lower end.

9. A pulp tester comprising a well tube, a sinker therein having a graduated stem for registering with said tube, and a series of baffles located at different heights on the stem, and means for supplying strained pulp liquid to the lower end of said tube.

10. A pulp tester comprising a well tube adapted to receive a liquid, a sinker mounted for uniform descent by gravity in the liquid column in the tube, said sinker having a specific gravity very slightly greater than one and being provided with indicating means, and immersible means surrounding the tube for supplying strained pulp liquid to said tube through its lower end.

ARTHUR B. GREEN.